US012340519B2

(12) United States Patent
Vongkulbhisal et al.

(10) Patent No.: US 12,340,519 B2
(45) Date of Patent: Jun. 24, 2025

(54) EXTRACTING TRAJECTORIES FROM ARROW PICTOGRAMS

(71) Applicant: INTERNATIONAL BUSINESS MACHINES CORPORATION, Armonk, NY (US)

(72) Inventors: Jayakorn Vongkulbhisal, Tokyo (JP); Pablo Salvador Loyola Heufemann, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 653 days.

(21) Appl. No.: 17/551,825

(22) Filed: Dec. 15, 2021

(65) Prior Publication Data

US 2023/0186484 A1 Jun. 15, 2023

(51) Int. Cl.
*G06T 7/20* (2017.01)
*B60W 30/09* (2012.01)
(Continued)

(52) U.S. Cl.
CPC ............... *G06T 7/20* (2013.01); *B60W 30/09* (2013.01); *G06T 3/18* (2024.01); *G06T 7/70* (2017.01);
(Continued)

(58) Field of Classification Search
CPC ...... G06V 20/58; G06V 20/588; G06V 10/40; G06V 10/772; G06V 10/44; G06V 10/467;
(Continued)

(56) References Cited

U.S. PATENT DOCUMENTS 6,377,710 B1   4/2002  Saund
7,623,731 B2 * 11/2009 Lim ........................ G06T 7/20
                                                              382/277
(Continued)

FOREIGN PATENT DOCUMENTS

CN      107886035 A  *  4/2018   ......... G06K 9/00825
CN      110503660 A      11/2019
(Continued)

OTHER PUBLICATIONS

Vavilin, A., & Jo, K. H. (2007). Automated junction structure recognition from road guidance signs. In Advanced Intelligent Computing Theories and Applications. With Aspects of Theoretical and Methodological Issues (pp. 1364-1373). Springer Berlin Heidelberg. (Year: 2007).*

(Continued)

*Primary Examiner* — Henok Shiferaw
*Assistant Examiner* — Toluwani Mary-Jane Ijaseun
(74) *Attorney, Agent, or Firm* — Tutunjian & Bitetto, P.C.; Robert Richard Aragona

(57) ABSTRACT

A method extracts a trajectory of an arrow in a binary image. The method extracts a skeleton of an arrow in the image and splits the skeleton into bones. For each of the bones, the method extends a bone to obtain an extended bone having both ends of the bone reaching a border of the arrow, and warps the extended bone into a straight line using a thin plate spline. For each bone, the method warps the binary image into a warped image using a thin plate spline with same parameters as the thin plate spline used to warp the extended bone into the straight line. For each bone, the method selects a component that includes a center point of the warped image, computes a symmetric error of the selected component, and selects, as the trajectory of the arrow, a bone where the selected component has the lowest symmetric error.

18 Claims, 12 Drawing Sheets

(51) Int. Cl.
*G06T 3/18* (2024.01)
*G06T 7/70* (2017.01)

(52) U.S. Cl.
CPC .............. *B60W 2420/403* (2013.01); *G06T 2207/30241* (2013.01)

(58) Field of Classification Search
CPC .............. G06V 20/582; G06T 7/10; G06T 2207/30241; G06T 2207/30256; G06T 3/18; G06T 7/20; G06T 2207/30204; G06T 7/70; B60W 30/09; B60W 2420/403
See application file for complete search history.

(56) References Cited

U.S. PATENT DOCUMENTS

| | | | | |
|---|---|---|---|---|
| 10,133,274 | B2* | 11/2018 | Shashua | G08G 1/096805 |
| 2011/0106855 | A1 | 5/2011 | Resch et al. | |
| 2020/0184809 | A1* | 6/2020 | Lee | G08G 1/096861 |

FOREIGN PATENT DOCUMENTS

| | | |
|---|---|---|
| CN | 113420692 A | 9/2021 |
| CN | 113659307 A | 11/2021 |
| JP | 2020187396 A | 11/2020 |
| WO | 2023/109256 A1 | 6/2023 |

OTHER PUBLICATIONS

Rebut, J., A. Bensrhair, and G. Toulminet. "Image segmentation and pattern recognition for road marking analysis." 2004 IEEE International Symposium on Industrial Electronics. vol. 1. IEEE, 2004. (Year: 2004).*

Maier, Georg, Sebastian Pangerl, and Andreas Schindler. "Real-time detection and classification of arrow markings using curve-based prototype fitting." 2011 IEEE Intelligent Vehicles Symposium (IV). IEEE, 2011. (Year: 2011).*

A. Ahmed, A. Soliman, A. Maged, M. Gaafar and M. Magdy, "Path Smoothing Algorithm Using Thin-Plate Spline," 2021 7th International Conference on Control, Automation and Robotics (ICCAR), Singapore, 2021, pp. 349-353, doi: 10.1109/ICCAR52225.2021. 9463453 (Year: 2021).*

Kurata, Yohei, and Max J. Egenhofer. "Structure and semantics of arrow diagrams." International Conference on Spatial Information Theory. Berlin, Heidelberg: Springer Berlin Heidelberg, 2005. (Year: 2005).*

Kurata, Yohei, et al. "Semantics of Simple Arrow Diagrams", inAAAI Spring Symposium: Reasoning with Mental and External Diagrams: Computational Modeling and Spatial Assistance. Mar. 2005, pp. 101-104.

Youn, Junhee, et al. "Automatic Extraction of Direction Information from Road Sign Images Obtained by a Mobile Mapping System", inGeospatial World Forum. May 9, 2014, pp. 1-10.

Chhabra, Atul K. et al. "Graphic symbol recognition: An overview", inInternational Workshop on Graphics Recognition, Springer, Berlin, Heidelberg. Aug. 22, 1997, pp. 68-79.

Andrey, Vavilin, et al. "Road guidance sign recognition in urban areas by structure", in2006 International Forum on Strategic Technology. Oct. 2006, pp. 293-296.

Wendling, Laurent, et al. "A New Way to Detect Arrows in Line Drawings", IEEE Transactions on Pattern Analysis and Machine Intelligence, vol. 26, No. 7. Jul. 2004, pp. 935-941.

Santosh, K.C., et al. Overlaid arrow detection for labeling regions of interest in biomedical images. IEEE Intelligent Systems. Feb. 18, 2016, pp. 1-17.

Santosh, K.C., et al. "A Simple and E+cient Arrowhead Detection Technique in Biomedical Images", International Journal of Pattern Recognition and Artificial Intelligence, vol. 30, No. 5. Apr. 1, 2016, pp. 1-16.

Bresler, Martin, et al. "Detection of arrows in on-line sketched diagrams using relative stroke positioning", in2015 IEEE Winter Conference on Applications of Computer Vision. Jan. 5, 2015, pp. 610-617.

Ertler, Christian, et al. "The mapillary traffic sign dataset for detection and classification on a global scale", inEuropean Conference on Computer Vision. Springer, Cham. Aug. 23, 2020, pp. 1-17.

Tabernik, Domen, et al. "Deep Learning for Large-Scale Traffic-Sign Detection and Recognition", IEEE Transactions on Intelligent Transportation Systems, vol. 21, No. 4. Apr. 2020, pp. 1427-1440.

Zhang, T.Y. et al. "A Fast Parallel Algorithm for Thinning Digital Patterns", Research Contributions, Image Processing and Computer Vision, vol. 27, No. 3. Mar. 1984, pp. 236-239.

Zhu, Zhe, et al. "Traffic-sign detection and classification in the wild", inProceedings of the IEEE conference on computer vision and pattern recognition. Jun. 2016, pp. 2110-2118.

Khan, Jesmin F., et al. "Image Segmentation and Shape Analysis for Road-Sign Detection", IEEE Transactions on Intelligent Transportation Systems, vol. 12, No. 1. Mar. 2011, pp. 83-96.

International Search Report from PCT/CN2022/123187 dated Dec. 15, 2022. (9 pages).

Kurata et al. "Structure and Semantics of Arrow Diagrams", Spatial Information Theory, Sep. 2005, pp. 232-250.

* cited by examiner

EXTRACTING TRAJECTORIES FROM ARROW PICTOGRAMS

BACKGROUND

The present invention generally relates to image processing, and more particularly to extracting trajectories from arrow pictograms.

Arrow pictograms are ubiquitous in direction signs in public spaces. Arrow pictograms provide directional instruction to follow. This has many applications in navigation (human, robots, and assistive technologies for blind persons, for example). However, there is a need for extracting trajectories from arrow pictograms.

SUMMARY

According to aspects of the present invention, a computer-implemented method is provided for extracting a trajectory of an arrow in a binary image. The method includes acquiring a binary image of an arrow. The method further includes extracting a skeleton of the arrow. The method also includes splitting the skeleton into bones. For each of the bones, by a processor device, the method includes extending a bone to obtain an extended bone having both ends of the bone reaching a border of the arrow, and warping the extended bone into a straight line using a thin plate spline. For each of the bones, by the processor device, the method includes warping the binary image into a warped image using a thin plate spline with same parameters as the thin plate spline used to warp the extended bone into the straight line. For each of the bones, by the processor device, the method further includes selecting a component that includes a center point of the warped image. For each of the bones, by the processor device, the method also includes computing a symmetric error of the selected component. For each of the bones, by the processor device, the method additionally includes selecting, as the trajectory of the arrow, a bone where the selected component has the lowest symmetric error.

According to other aspects of the present invention, a computer program product is provided for extracting a trajectory of an arrow in a binary image. The computer program product includes a non-transitory computer readable storage medium having program instructions embodied therewith. The program instructions are executable by a computer to cause the computer to perform a method. The method includes acquiring, by a processor device, a binary image of an arrow. The method further includes extracting, by the processor device, a skeleton of the arrow. The method also includes splitting, by the hardware processor, the skeleton into bones. For each of the bones, by the processor device, the method includes extending a bone to obtain an extended bone having both ends of the bone reaching a border of the arrow, and warping the extended bone into a straight line using a thin plate spline. For each of the bones, by the processor device, the method further includes warping the binary image into a warped image using a thin plate spline with same parameters as the thin plate spline used to warp the extended bone into the straight line. For each of the bones, by the processor device, the method also includes selecting a component that includes a center point of the warped image. For each of the bones, by the processor device, the method additionally includes computing a symmetric error of the selected component. For each of the bones, by the processor device, the method further includes selecting, as the trajectory of the arrow, a bone where the selected component has the lowest symmetric error.

According to yet other aspects of the present invention, a computer processing system is provided for extracting a trajectory of an arrow in a binary image. The computer processing system includes a memory device for storing program code. The computer processing system further includes a processor device operatively coupled to the memory device for running the program code to acquire a binary image of an arrow, extract a skeleton of the arrow, and split the skeleton into bones. For each of the bones, the processor device extends a bone to obtain an extended bone having both ends of the bone reaching a border of the arrow. For each of the bones, the processor device warps the extended bone into a straight line using a thin plate spline. For each of the bones, the processor device warps the binary image into a warped image using a thin plate spline with same parameters as the thin plate spline used to warp the extended bone into the straight line. For each of the bones, the processor device selects a component that includes a center point of the warped image. For each of the bones, the processor device computes a symmetric error of the selected component. For each of the bones, the processor device selects, as the trajectory of the arrow, a bone where the selected component has the lowest symmetric error.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to extracting trajectories from arrow pictograms.

Embodiments of the present invention form a skeleton within an arrow of a binary image, segment the skeleton into bones, extend the bones, and use thin plane splines to warp the extended bones and the binary image into warped images. Embodiments of the present invention thereafter select a center component in each of the warped images, compute a symmetric error of the center component, and determine a trajectory based on the symmetric error. In this way, an arrow pictogram can be transformed into a trajectory.

Embodiments of the present invention can be used in, for example, navigation applications. For example, embodiments of the present invention can be used for humans, robots, assistive technologies for blind persons, and so forth. These and other applications to which the present invention can be applied are readily determined by one of ordinary skill in the art given the teachings of the present invention provided herein.

Figure 1:
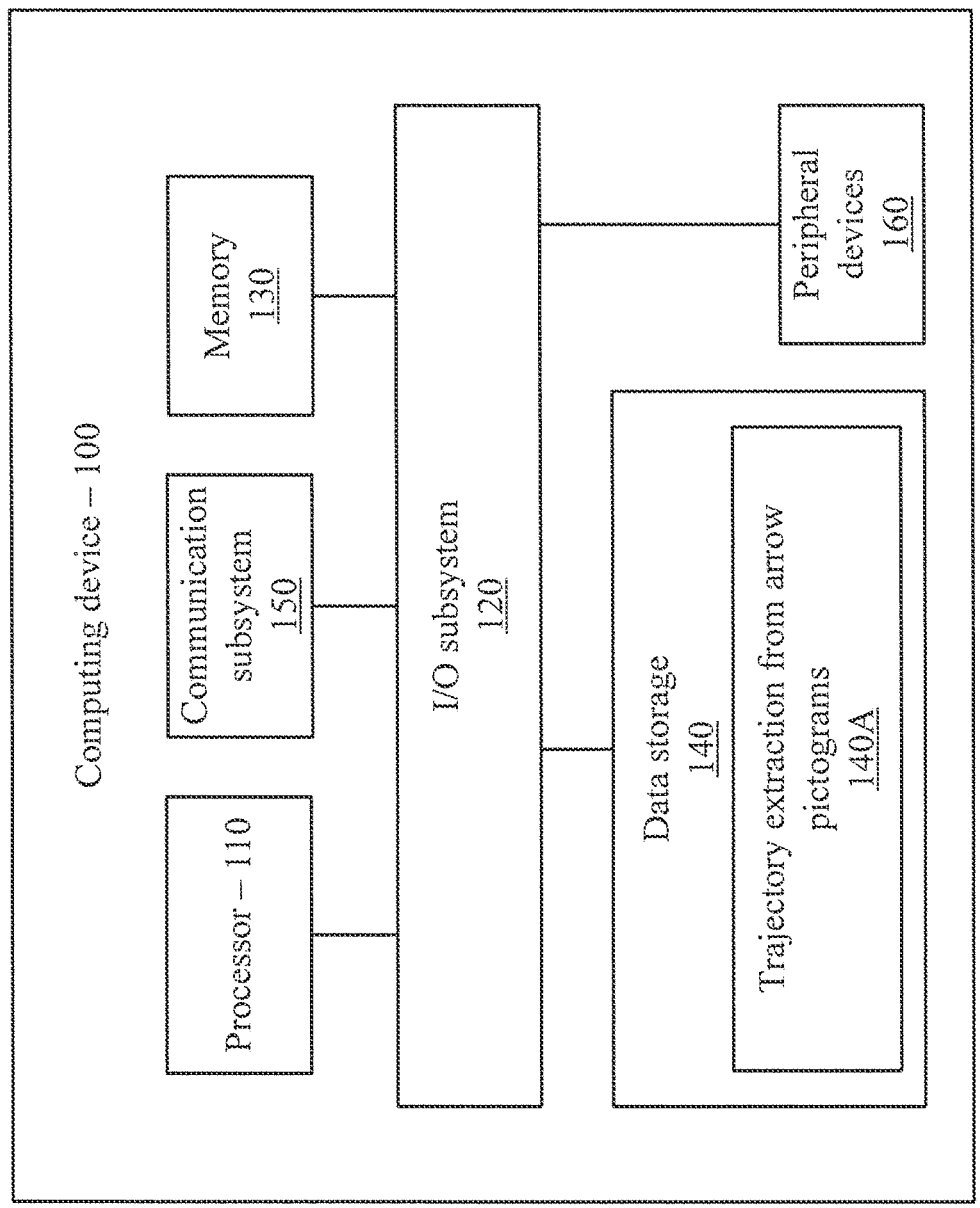
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform trajectory extraction from arrow pictograms.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for trajectory extraction from arrow pictograms. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
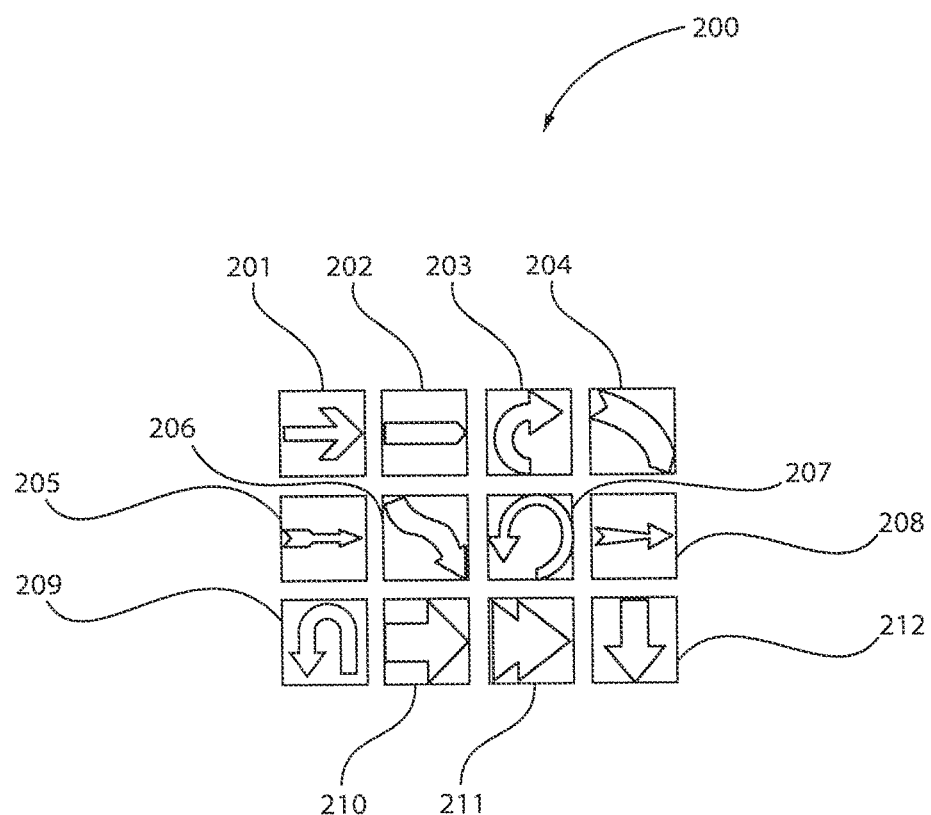
FIG. 2 is a diagram shows exemplary arrow designs to which the present invention can be applied, in accordance with an embodiment of the present invention.

These and other variations of a hardware processor subsystem are also contemplated in accordance with embodiments of the present invention FIG. 2 is a diagram shows exemplary arrow designs 200 to which the present invention can be applied, in accordance with an embodiment of the present invention.

Twelve different arrow designs 201 through 212 are depicted. Each are different from each other in at least one way (head and tail designs, straight, curved, wiggly, width, length, thickness in different parts, number of arrowheads, etc.).

Figure 3:
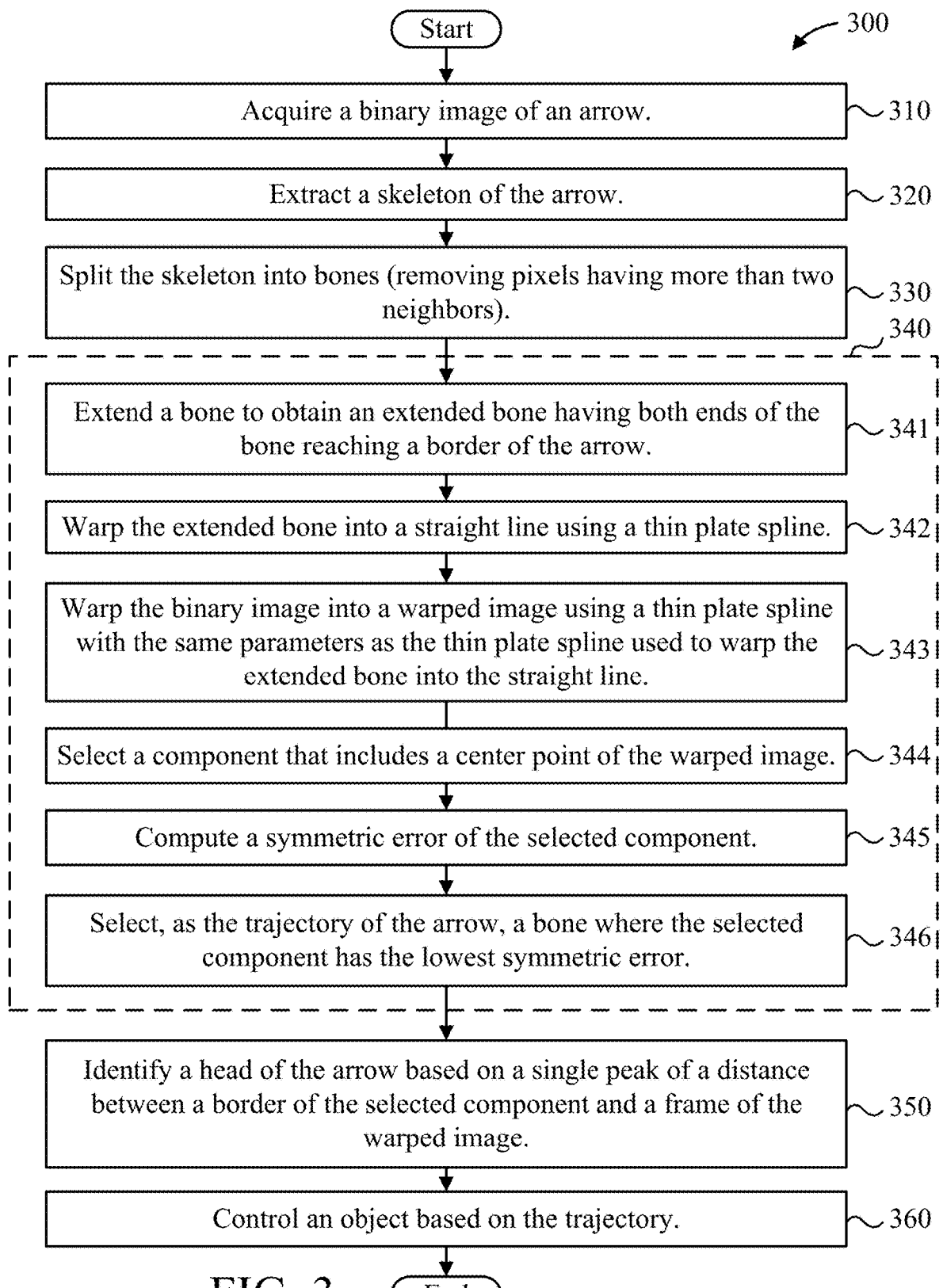
FIG. 3 is a flow diagram showing an exemplary method for trajectory extraction from arrow pictograms, in accordance with an embodiment of the present invention.

FIG. 3 is a flow diagram showing an exemplary method 300 for trajectory extraction from arrow pictograms, in accordance with an embodiment of the present invention.

At block 310, acquire a binary image of an arrow.

At block 320, extract a skeleton of the arrow.

At block 330, split the skeleton into bones. In an embodiment, the skeleton can have a single pixel width, and splitting the skeleton into bones can include removing pixels having more than two neighbors.

Block 340 is performed for each of the bones and includes blocks 341 through 346.

At block 341, extend a bone to obtain an extended bone having both ends of the bone reaching a border of the arrow. Extending a bone involves determining directions of both of the ends of the bone, and extending both of the ends of the bone to correspond to the determined directions.

At block 342, warp the extended bone into a straight line using a thin plate spline.

At block 343, warp the binary image into a warped image using a thin plate spline with the same parameters as the thin plate spline used to warp the extended bone into the straight line.

At bock 344, select a component that includes a center point of the warped image.

At block 345, compute a symmetric error of the selected component. The symmetric error is defined as the L2 difference between the selected component in the warped image and its left-right flipped version.

At block 346, select, as the trajectory of the arrow, a bone where the selected component has the lowest symmetric error.

At block 350, identify a head of the arrow based on a single peak of a distance between a border of the selected component and a frame of the warped image.

At block 360, perform an action responsive to the trajectory. In an embodiment, automatically control a vehicle system responsive to the trajectory of the arrow. In an embodiment, the vehicle system is controlled to avoid a collision with an object. In an embodiment, the vehicle system is controlled to control a vehicle to follow road direction changes.

Figure 4:
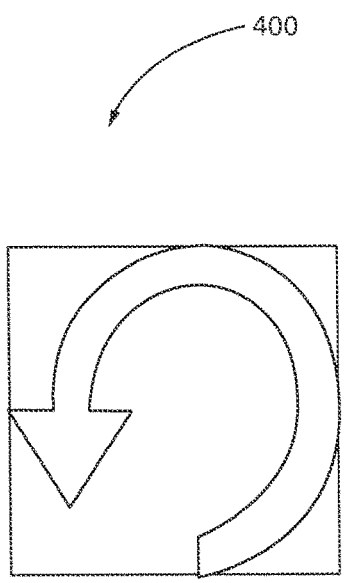
FIG. 4 is a diagram showing an exemplary arrow pictogram to which the present invention can be applied, in accordance with an embodiment of the present invention.

FIG. 4 is a diagram showing an exemplary arrow pictogram 400 to which the present invention can be applied, in accordance with an embodiment of the present invention.

The arrow pictogram 400 depicts a curved arrow.

Figure 5:
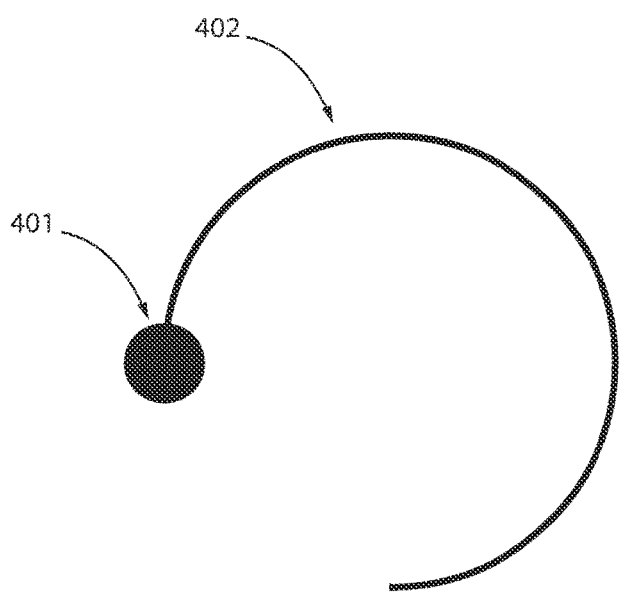
FIG. 5 is a diagram showing the arrowhead portion and curved segment portion of the arrow pictogram of FIG. 4, in accordance with an embodiment of the present invention.

FIG. 5 is a diagram showing the arrowhead portion 401 and curved segment portion 402 of the arrow pictogram 400 of FIG. 4, in accordance with an embodiment of the present invention.

The arrowhead portion 401 is depicted as a point corresponding to the beginning of the arrowhead.

The goal of the present invention is to extract one curve segment representing the arrow trajectory.

Figure 6:
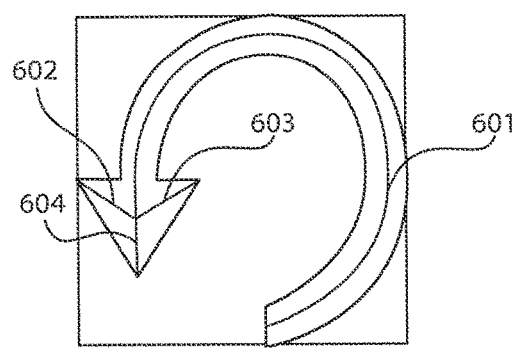
FIG. 6 is a diagram showing a 4-bone skeleton derived from the input arrow pictogram of FIG. 4, in accordance with an embodiment of the present invention.

FIG. 6 is a diagram showing a 4-bone skeleton derived from the input arrow pictogram 400 of FIG. 4, in accordance with an embodiment of the present invention. A skeleton is an essentially centralized structure within an arrow portion. A skeleton can be considered as a graph (V, E), where each vertex vεV is a pixel in the skeleton, and there is an edge eεE between 2 vertices if their pixels are adjacent in the image. The 4-bone skeleton includes first through fourth bones 601, 602, 603, and 604.

Figure 7:
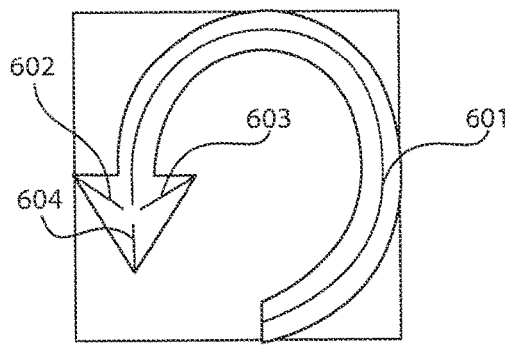
FIG. 7 is a diagram showing a splitted 4-bone skeleton from the 4-bone skeleton of FIG. 6, in accordance with an embodiment of the present invention.

FIG. 7 is a diagram showing a split 4-bone skeleton from the 4-bone skeleton of FIG. 6, in accordance with an embodiment of the present invention.

Figure 8:
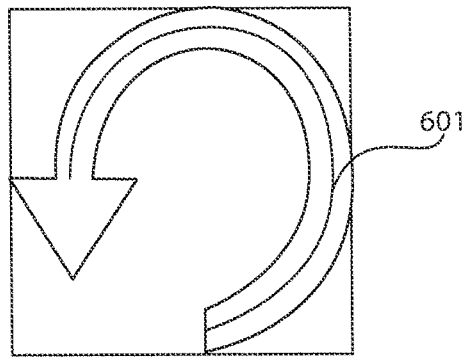
FIG. 8 is a diagram showing a first bone, in accordance with an embodiment of the present invention.
Figure 9:
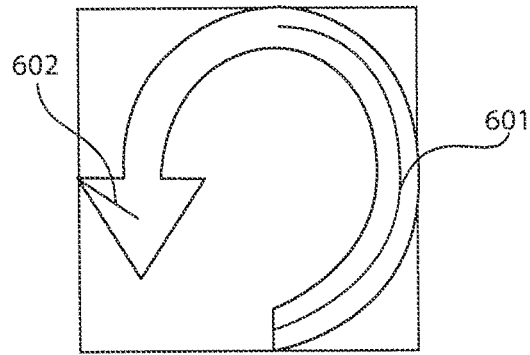
FIG. 9 is a diagram showing a second bone, in accordance with an embodiment of the present invention.
Figure 10:
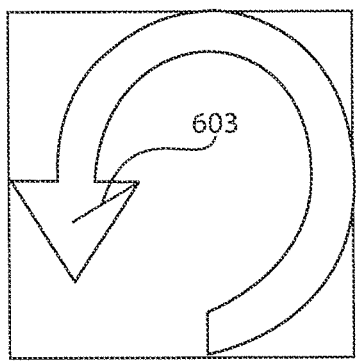
FIG. 10 is a diagram showing a third bone, in accordance with an embodiment of the present invention.
Figure 11:
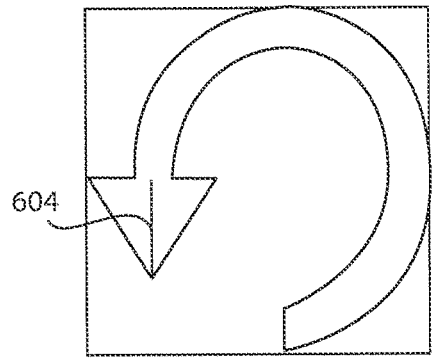
FIG. 11 is a diagram showing a fourth bone, in accordance with an embodiment of the present invention.

FIG. 8 is a diagram showing a first bone 601, in accordance with an embodiment of the present invention. FIG. 9 is a diagram showing a second bone 602, in accordance with an embodiment of the present invention. FIG. 10 is a diagram showing a third bone 603, in accordance with an embodiment of the present invention. FIG. 11 is a diagram showing a fourth bone 604, in accordance with an embodiment of the present invention. The bones 601 through 604 are obtained by removing skeleton pixels with more than 2 neighbors. For example, for skeletons one-pixel wide, 2 neighbors indicates more than one path, thus indicating more than one bone is present. Here, bones are defined as path graphs obtained from the procedure of removing pixels with more than 2 neighbors. In an embodiment, a skeleton has a single pixel width.

Figure 12:
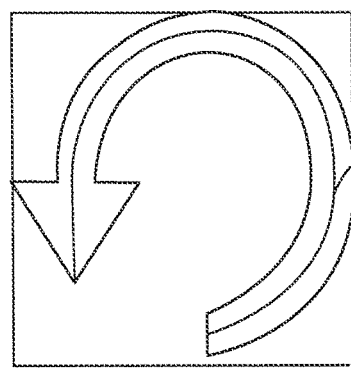
FIG. 12 is a diagram showing an extended first bone, in accordance with an embodiment of the present invention.
Figure 13:
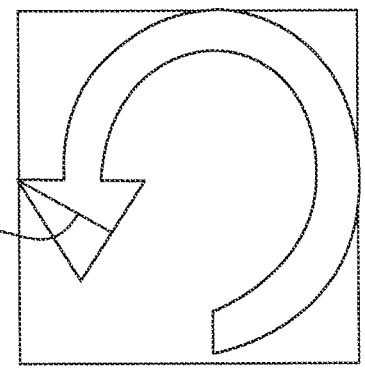
FIG. 13 is a diagram showing an extended second bone, in accordance with an embodiment of the present invention.
Figure 14:
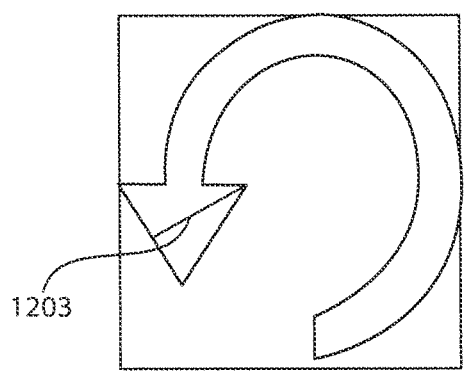
FIG. 14 is a diagram showing an extended third bone, in accordance with an embodiment of the present invention.
Figure 15:
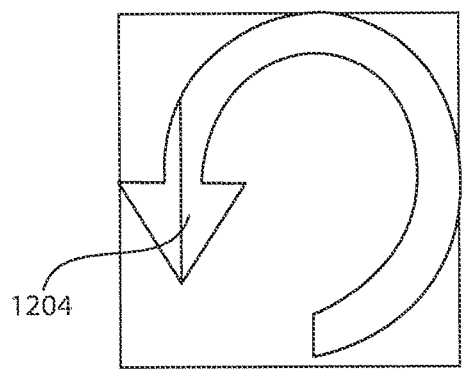
FIG. 15 is a diagram showing an extended fourth bone, in accordance with an embodiment of the present invention.

FIG. 12 is a diagram showing an extended first bone 1201, in accordance with an embodiment of the present invention. FIG. 13 is a diagram showing an extended second bone 1202, in accordance with an embodiment of the present invention. FIG. 14 is a diagram showing an extended third bone 1203, in accordance with an embodiment of the present invention. FIG. 15 is a diagram showing an extended fourth bone 1204, in accordance with an embodiment of the present invention. The bones 601 through 604 are extended until both ends of each of the bones reach the arrow border in order to obtain extended bones 1201 through 1204. That is, find the direction of each bone end. Extend the bone end until it teaches the border of the shape.

Figure 16:
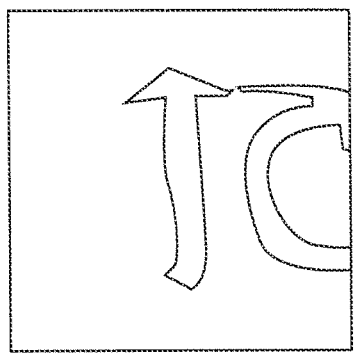
FIG. 16 is a diagram showing a warped image corresponding to warping the arrow pictogram of FIG. 4 and the extended first bone, in accordance with an embodiment of the present invention.
Figure 17:
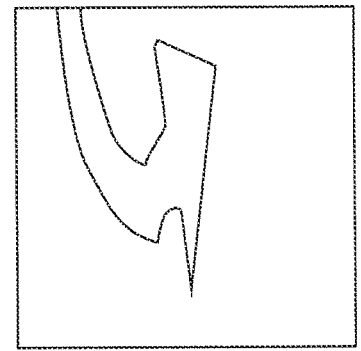
FIG. 17 is a diagram showing a warped image corresponding to warping the arrow pictogram of FIG. 4 and the extended second bone, in accordance with an embodiment of the present invention.
Figure 18:
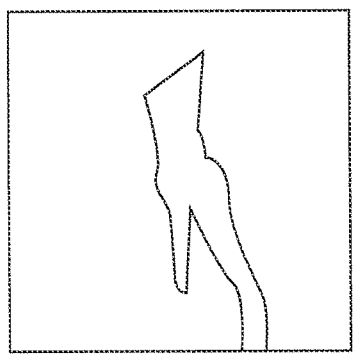
FIG. 18 is a diagram showing a warped image corresponding to warping the arrow pictogram of FIG. 4 and the extended third bone, in accordance with an embodiment of the present invention.
Figure 19:
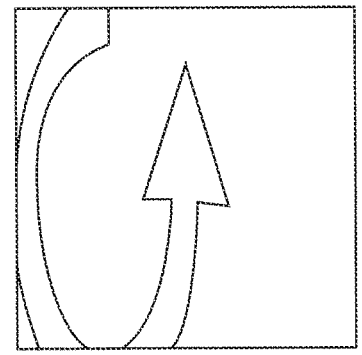
FIG. 19 is a diagram showing a warped image corresponding to warping the arrow pictogram of FIG. 4 and the extended fourth bone, in accordance with an embodiment of the present invention.

FIG. 16 is a diagram showing a warped image 1601 corresponding to warping the arrow pictogram 400 of FIG. 4 and the extended first bone 1201, in accordance with an embodiment of the present invention. FIG. 17 is a diagram showing a warped image 1701 corresponding to warping the arrow pictogram 400 of FIG. 4 and the extended second bone 1202, in accordance with an embodiment of the present invention. FIG. 18 is a diagram showing a warped image 1801 corresponding to warping the arrow pictogram 400 of FIG. 4 and the extended third bone 1203, in accordance with an embodiment of the present invention. FIG. 19 is a diagram showing a warped image 1901 corresponding to warping the arrow pictogram 400 of FIG. 4 and the extended fourth bone 1204, in accordance with an embodiment of the present invention.

Regarding warped image 1601, it is to be noted that thin plate spline (TPS) based warping can return multiple copies of a single pixel if the warp is highly curved. That is, there is no one-to-one mapping constraint in TPS, so one pixel in the original image may map to multiple pixels in the warped image. That is why there are two arrows depicted in warped image 1601.

Figure 20:
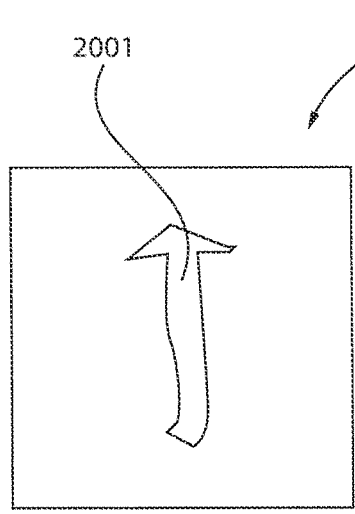
FIG. 20 is a diagram showing a selected center component from the warped image of FIG. 16, in accordance with an embodiment of the present invention.
Figure 21:
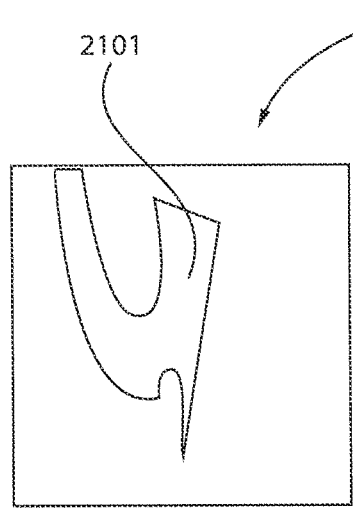
FIG. 21 is a diagram showing a selected center component from the warped image of FIG. 17, in accordance with an embodiment of the present invention.
Figure 22:
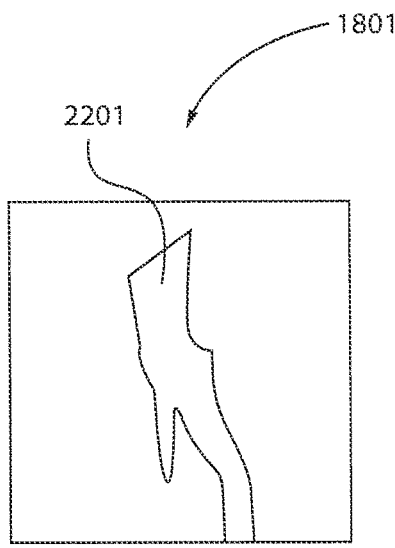
FIG. 22 is a diagram showing a selected center component from the warped image of FIG. 18, in accordance with an embodiment of the present invention.
Figure 23:
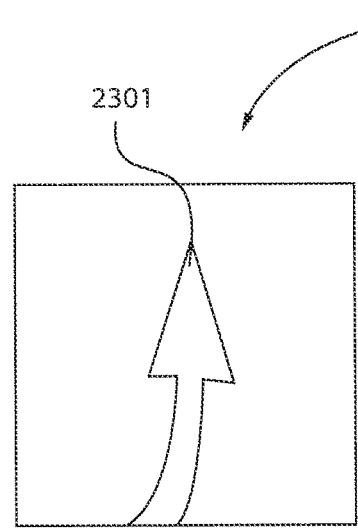
FIG. 23 is a diagram showing a selected center component from the warped image of FIG. 19, in accordance with an embodiment of the present invention.

FIG. 20 is a diagram showing a selected center component 2001 from warped image 1601 of FIG. 16, in accordance with an embodiment of the present invention. FIG. 21 is a diagram showing a selected center component 2101 from warped image 1701 of FIG. 17, in accordance with an embodiment of the present invention. FIG. 22 is a diagram showing a selected center component 2201 from warped image 1801 of FIG. 18, in accordance with an embodiment of the present invention. FIG. 23 is a diagram showing a selected center component 2301 from warped image 1901 of FIG. 19, in accordance with an embodiment of the present invention. In each of FIGS. 20-23, the component that includes the image center point it selected.

Figure 24:
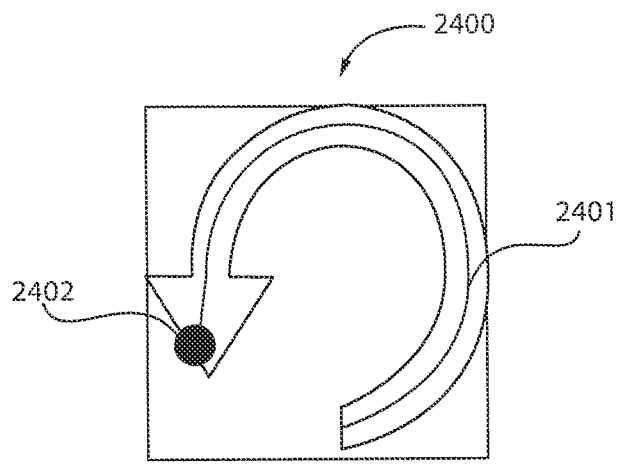
FIG. 24 is a diagram showing a trajectory output after center component selection and arrowhead determination, in accordance with an embodiment of the present invention.

FIG. 24 is a diagram showing a trajectory output 2400 after center component selection and arrowhead determination, in accordance with an embodiment of the present invention.

Figure 25:
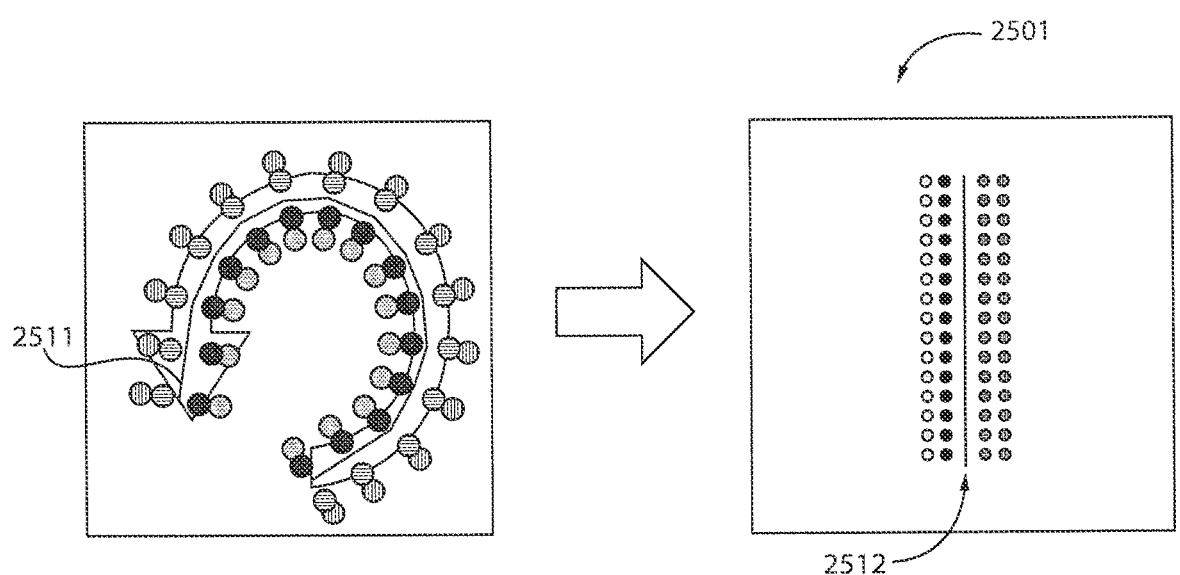
FIG. 25 is a diagram showing thin plane spline (TPS) computation on the arrow pictogram of FIG. 4, in accordance with an embodiment of the present invention.

The output includes a trajectory portion 2401 and an arrowhead portion 2402. In this case, the output is separated into trajectory and head. The model firstly identifies the optimal trajectory, which takes into account the shape of the arrow and which does not have any direction. After that, considering that resulting trajectory, the head is defined considering the two ends of the trajectory FIG. 25 is a diagram showing thin plane spline (TPS) computation on the arrow pictogram 400 of FIG. 4, in accordance with an embodiment of the present invention.

The TPS computation 2500 involves finding a mapping 2501 that maps the bone in the original image to a straight line in the warped image. Then by using this mapping, all pixels in the curved arrow 2511 can be mapped to the straight arrow 2512.

Figure 26:
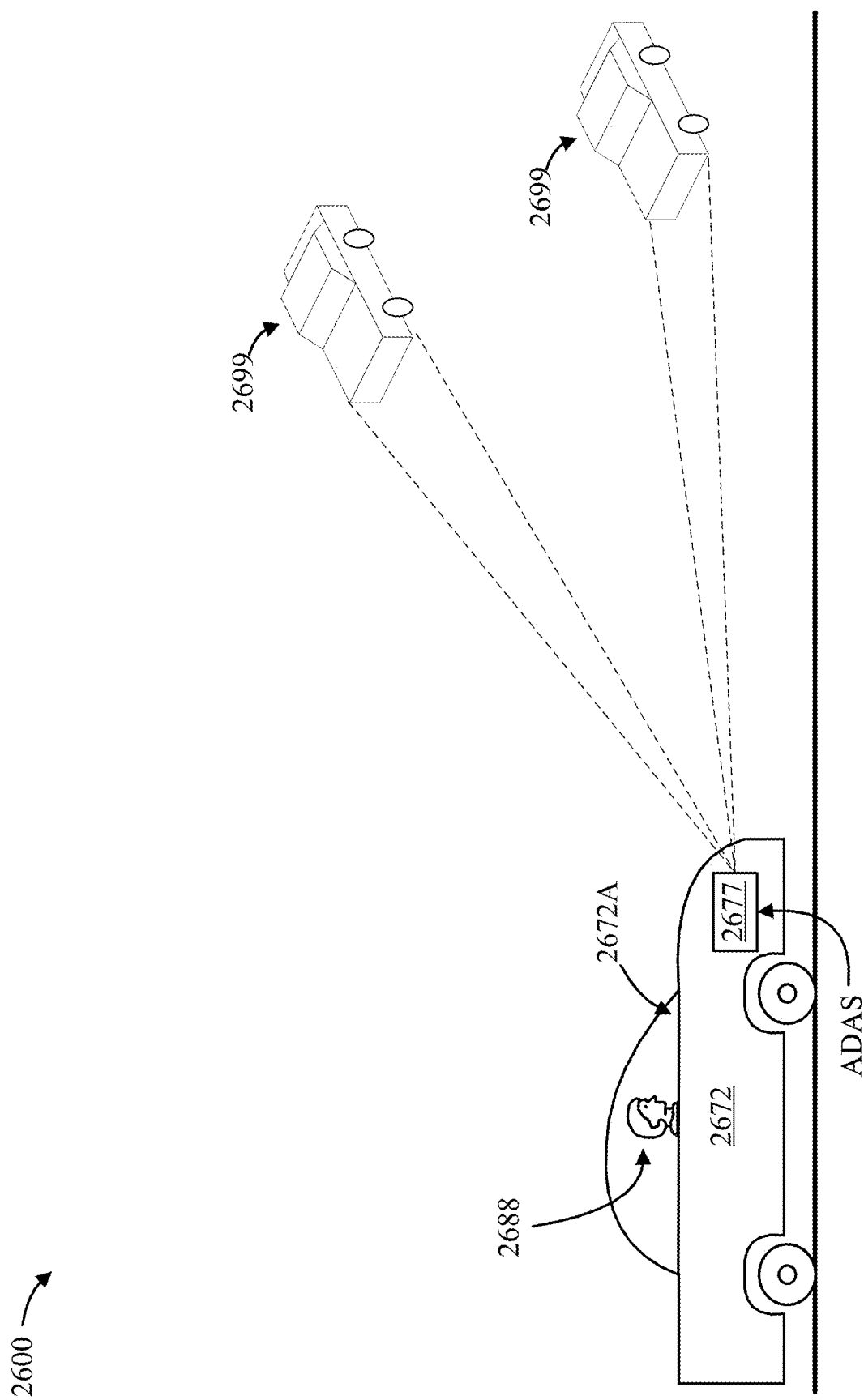
FIG. 26 is a block diagram showing an exemplary environment to which the present invention can be applied, in accordance with an embodiment of the present invention.

FIG. 26 is a block diagram showing an exemplary environment 2600 to which the present invention can be applied, in accordance with an embodiment of the present invention.

In the environment 2600, a user 2688 is located in a scene with multiple objects 2699, each having their own locations and trajectories. The user 2688 is operating a vehicle 2672 (e.g., a car, a truck, a motorcycle, etc.) having an advanced driver-assistance system (ADAS) 2677, The ADAS 2677 extracts a trajectory from an arrow pictogram.

Responsive to a trajectory, a vehicle controlling decision is made. To that end, the ADAS 2677 can control, as an action corresponding to a decision, for example, but not limited to, steering, braking, and accelerating systems.

Thus, in an ADAS situation, steering, accelerating/braking, friction (or lack of friction), yaw rate, lighting (hazards, high beam flashing, etc.), tire pressure, turn signaling, and more can all be efficiently exploited in an optimized decision in accordance with the present invention.

The system of the present invention (e.g., system 2600) may interface with the user through one or more systems of the vehicle 2672 that the user is operating. For example, the system of the present invention can provide the user information through a system 2672A (e.g., a display system, a speaker system, and/or some other system) of the vehicle 2672. Moreover, the system of the present invention (e.g., system 2600) may interface with the vehicle 2672 itself (e.g., through one or more systems of the vehicle 2672 including, but not limited to, a steering system, a braking system, an acceleration system, a steering system, a lighting (turn signals, headlamps) system, etc.) in order to control the vehicle and cause the vehicle 2672 to perform one or more actions. In this way, the user or the vehicle 2672 itself can navigate around these objects 2699 to avoid potential collisions there between. The providing of information and/or the controlling of the vehicle can be considered actions that are determined in accordance with embodiments of the present invention.

While described with respect to an ADAS, the present invention can be applied to a myriad of applications involving trajectory. For example, navigation involving automated agents, robots, assistive technologies for blind people, and/or so forth can be exploited by embodiments of the present invention. Embodiments of the present invention can be applied for extracting information from diagrams with arrows (e.g., textbook question and answering). Embodiments of the present invention can be used to generate ground truths to train machine learning algorithms. This would allow training models that can deal with other tasks, or make inference faster. Embodiments of the present invention do not need training and can work with new types/designs of arrows.

Figure 27:
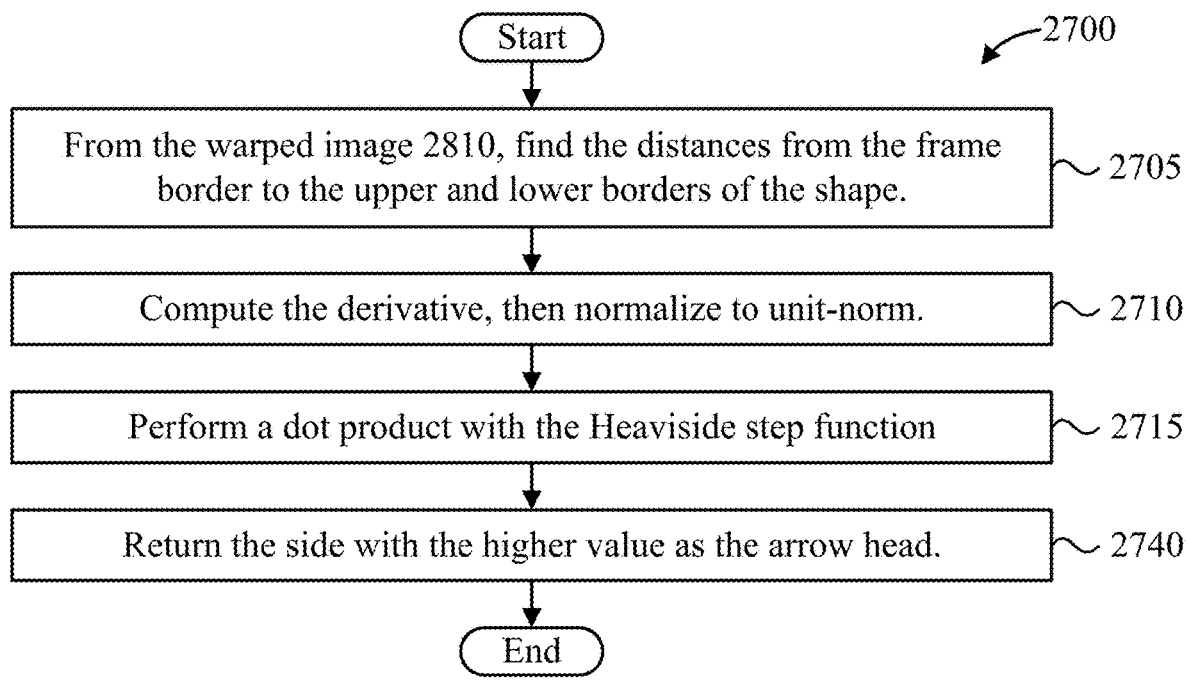
FIG. 27 is a flow diagram showing an arrowhead determination method, in accordance with an embodiment of the present invention.
Figure 28:
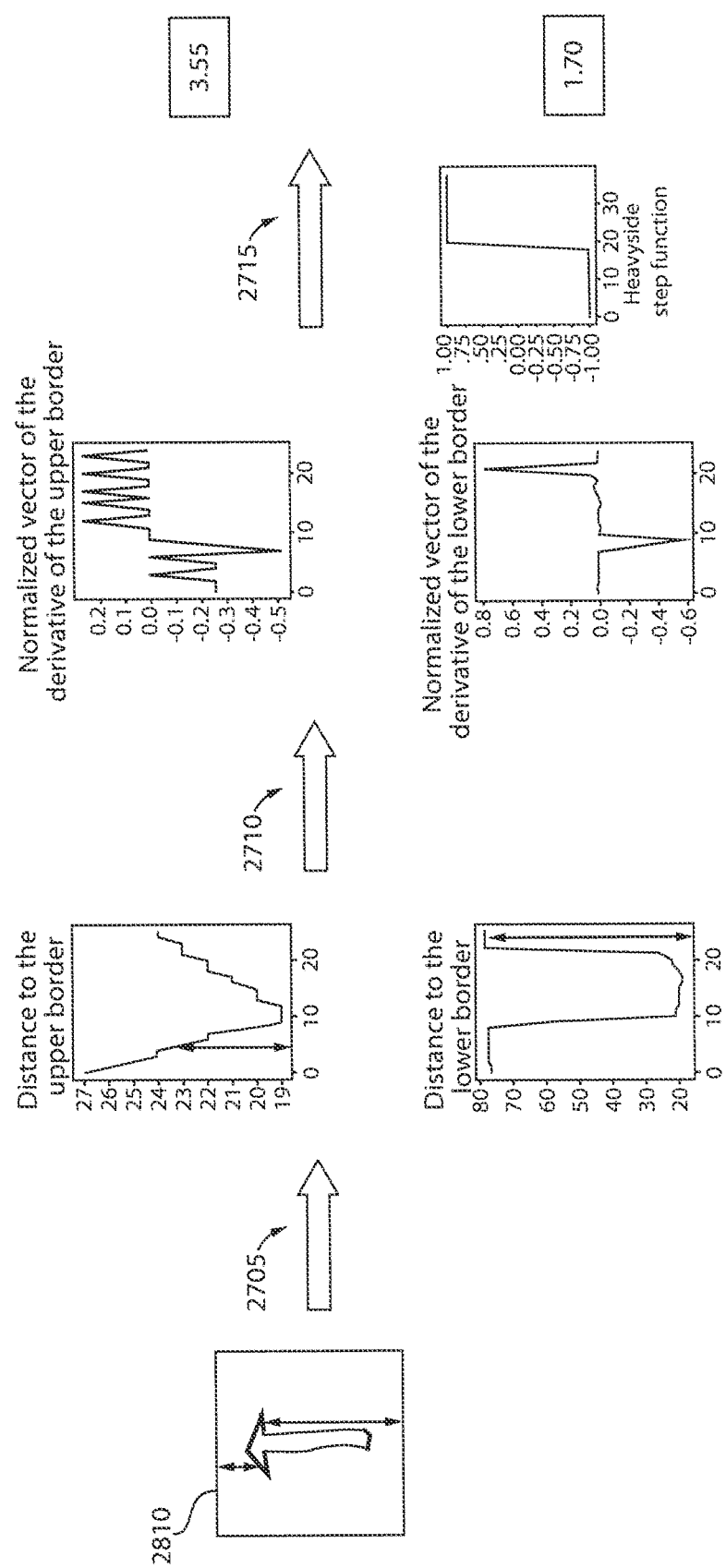
FIG. 28 is a block diagram graphically showing the arrowhead determination method of FIG. 27, in accordance with an embodiment of the present invention.

FIG. 27 is a flow diagram showing an arrowhead determination method 2700, in accordance with an embodiment of the present invention. FIG. 28 is a block diagram graphically showing the arrowhead determination method 2700 of FIG. 27, in accordance with an embodiment of the present invention.

At block 2705, from the warped image 2810, find the distances from the frame border to the upper and lower borders of the shape.

At block 2710, compute the derivative, then normalize to unit-norm. That is, determine a derivative of a function specifying a distance between an upper border of the selected component and the frame of the warped image, and determine a derivative of a function specifying a distance between a lower border of the selected component and the frame of the warped image.

At block 2715, perform a dot product with the Heaviside step function.

At block 2740, return the side with the higher value as the arrowhead.

This means the top side is returned as the arrowhead, namely 3.55 versus 1.70.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for extracting a trajectory of an arrow in a binary image, comprising:
acquiring a binary image of an arrow;
extracting a skeleton of the arrow;
splitting the skeleton into bones;
for each of the bones, by a processor device,
extending a bone to obtain an extended bone having both ends of the bone reaching a border of the arrow;
warping the extended bone into a straight line using a thin plate spline;
warping the binary image into a warped image using a thin plate spline with same parameters as the thin plate spline used to warp the extended bone into the straight line;
selecting a component that includes a center point of the warped image; and
computing a symmetric error of the selected component; and
selecting, as the trajectory of the arrow, a bone where the selected component has the lowest symmetric error; and
automatically controlling a vehicle system responsive to the trajectory of the arrow.

2. The computer-implemented method of claim 1, further comprising identifying a head of the arrow based on a single peak of a distance between a border of the selected component and a frame of the warped image.

3. The computer-implemented method of claim 1, wherein identifying a head of the arrow further comprises:
determining a derivative of a function specifying a distance between an upper border of the selected component and the frame of the warped image; and
determining a derivative of a function specifying a distance between a lower border of the selected component and the frame of the warped image.

4. The computer-implemented method of claim 1, further comprising:
normalizing vectors of the derivatives of the functions;
performing a dot product using the normalized vectors;
selecting a higher of two values as an arrowhead.

5. The computer-implemented method of claim 1, wherein the skeleton has a single pixel width, and splitting the skeleton into bones comprises removing pixels having more than two neighbors.

6. The computer-implemented method of claim 1, wherein extending a bone to obtain an extended bone comprises determining directions of both of the ends of the bone, and extending both of the ends of the bone to correspond to the determined directions.

7. The computer-implemented method of claim 1, wherein the vehicle system is controlled to avoid a collision with an object.

8. The computer-implemented method of claim 1, wherein warping the extended bone comprises finding a mapping from the bone in the binary image to a vertical straight line in the warped image.

9. The computer-implemented method of claim 1, wherein computing a symmetric error of the selected component comprises computing an L2 difference between the selected component and its left-to right flipped version.

10. A computer program product for extracting a trajectory of an arrow in a binary image, the computer program product comprising a non-transitory computer readable storage medium having program instructions embodied therewith, the program instructions executable by a computer to cause the computer to perform a method comprising:
acquiring, by a processor device, a binary image of an arrow;

extracting, by the processor device, a skeleton of the arrow;

splitting, by the processor device, the skeleton into bones;

for each of the bones, by the processor device, extending a bone to obtain an extended bone having both ends of the bone reaching a border of the arrow;

warping the extended bone into a straight line using a thin plate spline;

warping the binary image into a warped image using a thin plate spline with same parameters as the thin plate spline used to warp the extended bone into the straight line;

selecting a component that includes a center point of the warped image; and computing a symmetric error of the selected component; and selecting, as the trajectory of the arrow, a bone where the selected component has the lowest symmetric error; and automatically controlling a vehicle system responsive to the trajectory of the arrow.

11. The computer program product of claim 10, further comprising identifying a head of the arrow based on a single peak of a distance between a border of the selected component and a frame of the warped image.

12. The computer program product of claim 10, wherein identifying a head of the arrow further comprises:

determining a derivative of a function specifying a distance between an upper border of the selected component and the frame of the warped image; and determining a derivative of a function specifying a distance between a lower border of the selected component and the frame of the warped image.

13. The computer program product of claim 10, further comprising:

normalizing vectors of the derivatives of the functions;

performing a dot product using the normalized vectors;

selecting a higher of two values as an arrowhead.

14. The computer program product of claim 10, wherein the skeleton has a single pixel width, and splitting the skeleton into bones comprises removing pixels having more than two neighbors.

15. The computer program product of claim 10, wherein extending a bone to obtain an extended bone comprises determining directions of both of the ends of the bone, and extending both of the ends of the bone to correspond to the determined directions.

16. The computer program product of claim 10, wherein the vehicle system is controlled to avoid a collision with an object.

17. The computer program product of claim 10, wherein warping the extended bone comprises finding a mapping from the bone in the binary image to a vertical straight line in the warped image.

18. A computer processing system for extracting a trajectory of an arrow in a binary image, comprising:

a memory device for storing program code; and a processor device operatively coupled to the memory device for running the program code to:

acquire a binary image of an arrow;

extract a skeleton of the arrow;

split the skeleton into bones;

for each of the bones, extend a bone to obtain an extended bone having both ends of the bone reaching a border of the arrow;

warp the extended bone into a straight line using a thin plate spline;

warp the binary image into a warped image using a thin plate spline with same parameters as the thin plate spline used to warp the extended bone into the straight line;

select a component that includes a center point of the warped image; and computing a symmetric error of the selected component; and select, as the trajectory of the arrow, a bone where the selected component has the lowest symmetric error; and automatically control a vehicle system responsive to the trajectory of the arrow.

* * * * *